United States Patent [19]
Eucker

[11] 3,723,636
[45] Mar. 27, 1973

[54] APPLIANCE FOR LINEAR BODIES

[75] Inventor: Robert A. Eucker, Brooklyn, Ohio

[73] Assignee: Preformed Line Products Co., Cleveland, Ohio

[22] Filed: July 14, 1972

[21] Appl. No.: 271,707

[52] U.S. Cl. ............. 174/70 R, 24/122.6, 24/126 C, 174/79, 174/90, 174/93, 174/DIG. 12
[51] Int. Cl. ............................................. F16g 11/04
[58] Field of Search ........ 174/71 R, 70 R, 79, 90, 91, 174/93, 94 R, DIG. 12; 24/122.3, 122.6, 126 L, 126 C

[56] References Cited
UNITED STATES PATENTS

| | | | |
|---|---|---|---|
| 2,934,595 | 4/1960 | Earle | 174/79 X |
| 3,183,658 | 5/1965 | Peterson | 174/79 X |
| 3,475,795 | 11/1969 | Youngblood | 24/122.6 |
| 3,573,346 | 4/1971 | Appleby | 174/71 R |

*Primary Examiner*—James D. Trammell
*Attorney*—Jerry D. Hosier

[57] ABSTRACT

The disclosed termination appliance for a load bearing cable or the like is particularly suited to extraordinarily high load applications. The appliance comprises a first egg-shaped protuberance defining member secured to the cable by helically preformed elements wrapped in tightly encircling relation about the member and extending in gripping relation along the cable in opposite directions therefrom. A second member of a conforming contour is applied in overlying relation to the first member and a second set of helically preformed elements are applied in encircling overlying and gripping relation to the second member and the first set of helical elements to further enlarge the protuberance. The described sub-assembly is situated within a housing having contoured sidewalls for conformably seating the enlarged protuberance and a narrowed aperture for passing the cable. The concentric protuberance structures cooperate to share the load on the cable. Other features are disclosed.

12 Claims, 4 Drawing Figures

FIG. 1
FIG. 2
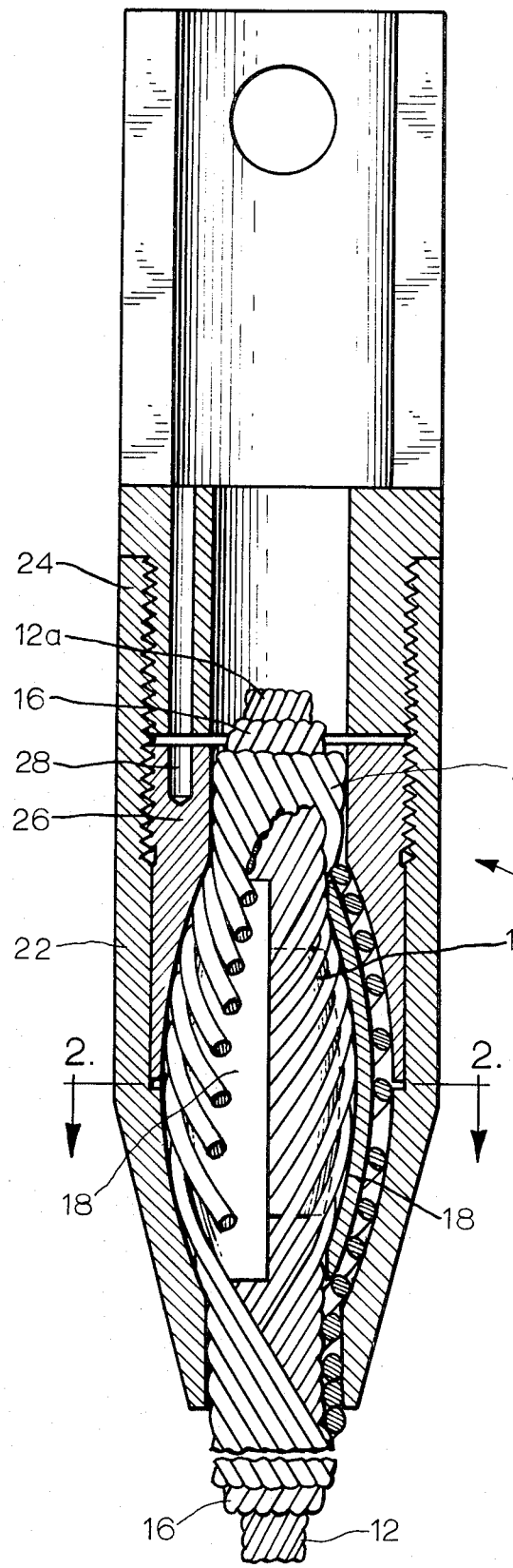
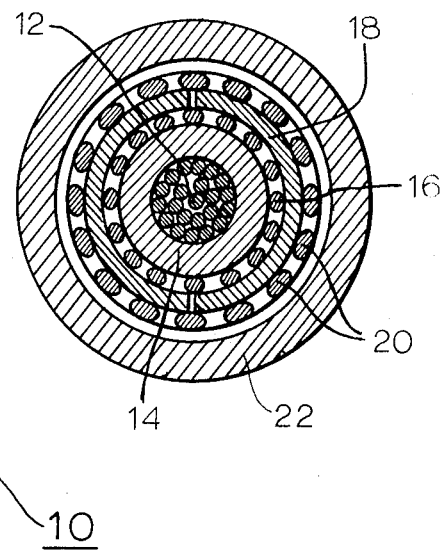

APPLIANCE FOR LINEAR BODIES

FIELD OF THE INVENTION

The present invention relates generally to appliances for linear bodies and, more particularly, is directed to termination or dead-end type appliances for load bearing cables or the like. The termination appliance of the present invention is particularly suited to applications where extraordinarily high tension strengths such as 200,000 pounds or more are required and to such extent the invention constitutes an improvement over the termination appliances disclosed and claimed in U.S. Pat. No. 3,573,346-Appleby, assigned to the same assignee as the present invention.

SUMMARY OF THE INVENTION

Termination appliances such as disclosed in the aforesaid patent and in a co-pending application Ser. No. 187,305, filed Oct. 7, 1971 have been found to be of exceptional utility for termination of load bearing cables in oceanographic applications and in various other environments. The structure of the present invention embodies many of the features and advantages of the structures of the above-identified patent and application, respectively, while embodying the further advantage of being peculiarly suited to reliably withstanding extraordinarily high cable loading, for example, in the approximate range of 200,000 to 600,000 pounds.

In accordance with the present invention, a termination appliance for a load bearing cable or the like comprises a first protuberance means including a first member applied about the cable and a first set of helically preformed elements of a predetermined internal diameter and pitch length wrapped in tightly encircling relation about the member and extending in gripping relation along the cable for respective predetermined distances in either direction therefrom. The first set of helical elements secure the first member to the cable so as to form a protuberance on the cable in the region of the first member. There is also provided second protuberance means comprising a second member composed of a plurality of sections applied in overlying relation to the first member and a second set of helically preformed elements of a predetermined internal diameter and pitch length wrapped in tightly encircling relation upon the second member in overlying relation to the first set of helically preformed elements and extending in gripping relation along the cable for respective predetermined distances in either direction therefrom. The second set of helical elements secures the second member to the first set of rods so as to further enlarge the first protuberance. The appliance further includes a housing means having sidewalls for conformably seating the enlarged protuberance with the first and second protuberance means adapted for sharing the load on the load bearing cable. An aperture of a diameter intermediate that of the cable and the enlarged protuberance is provided in the housing for passing the cable.

BRIEF DESCRIPTION OF THE DRAWINGS

The novel features of the present invention are set forth with particularity in the appended claims. The invention together with further objects and advantages thereof may best be understood, however, by reference to the following description taken in conjunction with the accompanying drawings in the several FIGS. of which like reference numerals identify like elements and in which:

FIG. 1 is a longitudinal section of a preferred embodiment of a termination appliance of the present invention;

FIG. 2 is a cross-sectional view taken along lines 2—2 of FIG. 1;

DESCRIPTION OF THE PREFERRED EMBODIMENT

Figure 3:
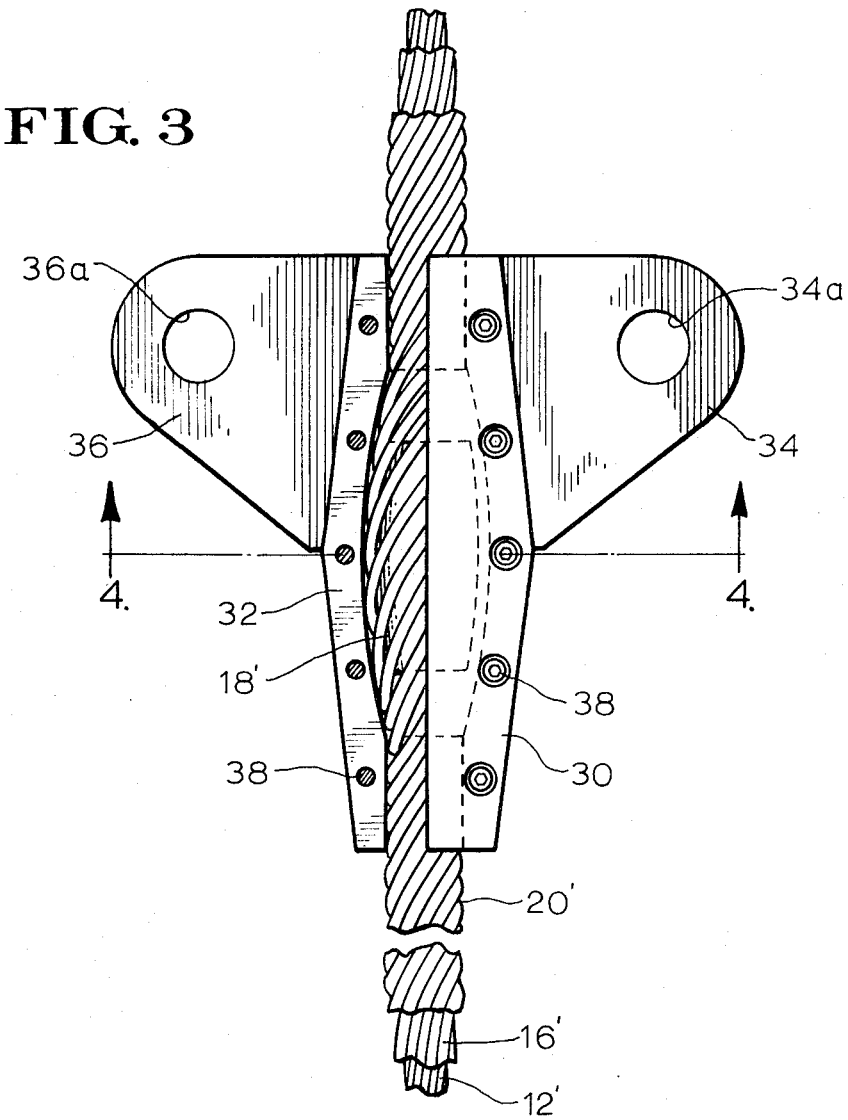
FIG. 3 is a side-elevational view, partly in section, of an alternate embodiment of the invention.

Referring now to FIG. 1, the termination appliance 10 there illustrated is adapted to receive and retain one end of a load bearing cable 12. The appliance 10 which will be described in the usual order of its assembly comprises a first protuberance means including a first member 14 applied about the cable at a preselected location. The member 14, only a portion of which is visible in the drawing, is preferably of an ellipsoidal or egg-shaped configuration with a central bore of a sufficiently large diameter for comfortably accommodating the cable 12. The member 14 may be of a one-piece construction that is slidably inserted over the end 12a of the cable 12, or alternatively, may be composed of a pair of mating half-sections applied about the cable. Although the egg-shape is preferred, those skilled in the art will recognize that the first member 14 may be of a different contour such as a cylinder or a tapered wedge. Also, although not presently preferred, the first member may be composed of half-sections that do not completely encompass the cable such that pressure on the half-sections is translated to the cable.

At any rate, the member 14 is secured to cable 12 by a first set of helically preformed elements 16 of a nominal internal diameter smaller than that of the cable 12 and of a suitable pitch length. The helical elements 16 are wrapped in tightly encircling relation about the member 14 and extend in gripping relation along the cable in either direction therefrom. The helical elements 16 may be of a like or opposite hand of lay to that of the strands of cable 12. The helical rods 16 in the present embodiment are asymmetrically disposed relative to member 14, the rods extending substantially further forward of the member 14 than they do rearwardly. The member 14 and the helical appliances 16 cooperatively form a protuberance on the cable in the region of the first member. The methods and means for forming such protuberances on cables are well known to the art and are disclosed and claimed in U.S. Pat. No. 3,007,243-Peterson, assigned to the same assignee as the present invention. Also certain pre-assembly techniques disclosed and claimed in the earlier mentioned application for patent may be utilized in connection with the appliance of the present invention.

A second protuberance means comprises a second member 18 applied in overlying relation to the first member 14 and of an interior surface contour conforming to that of the first protuberance. The second member 18 is preferably in the form of a rigid shell of uniform thickness and is composed of metal or the like.

As seen in the drawing, the member 18 is of a substantially greater length than the first member 14 and is applied to the first protuberance means so as to be centered about the member 14. Additionally, since it is desired that pressure applied to the member 18 be translated to the first protuberance means, the half-sections comprising member 18 are formed so as not to fully encompass the first protuberance means, a feature that may be appreciated most clearly by reference to the cross-sectional view of FIG. 2.

Once the shell member 18 is applied about the first protuberance and is temporarily secured thereto by tape or the like, a second set of helically preformed rods 20 is wrapped in tightly encircling relation about the member 18, the rods 20 also extending in opposite directions from the member 18 and in overlying and gripping relation with the first set of helical elements 16. Preferably, the second set of rods 20 are of a length so as not to extend in either direction beyond the rods 16. Additionally, since the rods 20 are applied about a structure of a nominal diameter greater than that about which the rods 16 are applied, the rods 20 may be of a nominal internal diameter somewhat greater than that of the rods 16. The second member 18 and the overlying helical rods 20 cooperate to further enlarge the first protuberance formed by the first member 14 and the helical rod set 16. The helical rod sets 16 and 20 are illustrated as being of an opposite hand of lay and such is presently preferred although it will be understood that the rods may be of a like hand of lay, if desired.

The appliance 10 further includes an elongated hollow housing means 22 having a lower or restraining end at which the cable 12 enters the housing and an upper or receiving end to which is coupled a clevis 24. The clevis 24 is threadably secured to the receiving end of the housing 22 and serves to effect a mechanical connection between the appliance 10 and a fixed body (not shown). It will be understood that the clevis 24 may take a variety of physical forms according to the structure to which it is desired to attach the appliance.

The housing 22 is of a generally cylindrical contour along its upper portion with the lower portion assuming a gradual conical taper; an interior passage extending through the full length of the housing is of a generally similar configuration. More specifically, the upper or receiving end of the housing 22 is of an internal diameter exceeding that of the enlarged protuberance while the lower or restraining end of the housing is provided with an aperture of a diameter intermediate that of the cable 12 and the enlarged protuberance. The sidewalls of the housing 22 at the restraining end are of a curved contour complementary to the contour of the protuberance thereby providing a secured seating of the protuberance.

It will, of course, be recognized that in assembling the appliance, the housing 22 is slidably received over the cable 12 prior to installation of the protuberance structures thereon and the clevis 24 is not fitted to the housing until the protuberance sub-assembly is disposed therein. Similarly, a contoured restraining member 26 which engages the rearward extent of the protuberance sub-assembly to securely locate the sub-assembly within the housing 22 is not installed in place until the protuberance sub-assembly is slidably inserted through the open receiving end of the housing 22.

The restraining member 26 is threadably received in the upper end of the housing 22 and includes a hollow central portion of a contour complementary to the rearward half-section of the egg-shaped protuberance. Thus, the forward half of the protuberance sits in the contoured restraining end of the housing 22 while the back half is confined in the contoured recess of the restraining member 26.

Tightening of the restraining member 26 into engagement with the back half of the protuberance sub-assembly is facilitated by means of a pair of Allen keys 28, only one of which is visible on the drawing. Specifically, the Allen keys 28 extend through respective bores in the cylindrical base of the clevis 24 into coaxially aligned receiving bores in the restraining member 26 to effect an interlock of the members 24 and 26. Thus, rotation of the clevis 24 by means of a spanner wrench or the like effects a tightening of the restraining member 24.

The described assembly procedure may also involve the pouring of a potting compound into the housing prior to disposition of the restraining member and clevis 26 and 24, respectively, therein in order to fill the interstices between the elements of the second helical set 20 and thereby obtain a more rigid locating of these elements. Various other assembly procedures may also be used consistent with the present invention such as the pre-assembly methods disclosed in the earlier identified co-pending application.

In operation, the loading applied to cable 12 is effectively shared by the concentric protuberance assemblies 14, 16 and 18, 20, respectively. This load sharing feature results in the single application 10 being able to operate reliably under cable loading conditions far in excess of those that may safely be handled with prior art devices as illustrated by the appliance of the earlier identified patent.

Figure 4:
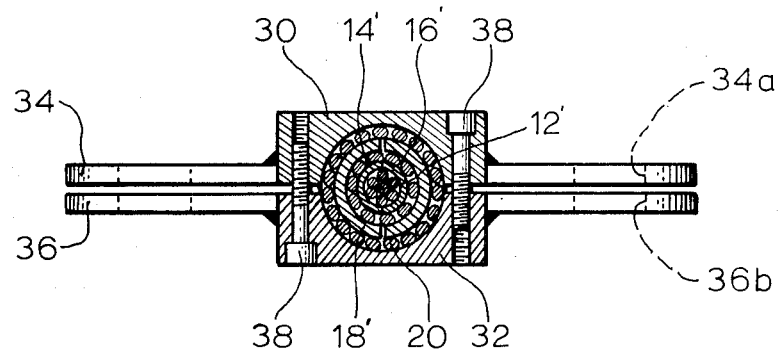
FIG. 4 is a cross-sectional view taken along lines 4—4 of FIG. 3.

An alternative embodiment of the invention is illustrated in FIGS. 3 and 4. This embodiment is identical to that of FIGS. 1 and 2 excepting for the structure of the housing means. The correspondence with FIGS. 1 and 2 is denoted by using like reference numerals with the addition of primes in FIGS. 3 and 4 to identify common components. In this regard, it will be appreciated that the enlarged protuberance means of FIGS. 3 and 4 is comprised of the same components and is assembled in the same fashion as the corresponding structure of FIGS. 1 and 2.

The housing means is comprised of a pair of mating half-sections 30 and 32 that are applied about the enlarged protuberance from opposite sides of the cable 12'. The mating sections 30, 32 preferably are formed from machined steel although in some circumstances castings may provide sufficient structural strength. The mating sections 30, 32 cooperatively define a contoured receiving portion for conformably seating the enlarged protuberance and an aperture at one end for passing the cable 12'. The mating sections 30, 32 may also include an aperture at the opposite end for passing the cable 12' to permit installation of the appliance at desired location along the length of a cable. Attachment of the housing to a fixed support (not shown) is effected by means of flattened ear portions 34 and 36 that extend outwardly from the sections 30 and 32, respectively, and include respective bolt receiving apertures 34a and 36a. The mating half-sections 30, 32 are secured to one another in tightly encircling relation to the enlarged protuberance by means of a series of bolts 38 having head portions that seat in recesses of one of the mating sections and extend therethrough into threaded engagement with the other section.

While particular embodiments of the present invention have been shown and described, it is apparent that various changes and modifications may be made, and it is therefore intended in the following claims to cover all such modifications and changes as may fall within the true spirit and scope of this invention.

I claim:

1. A termination appliance for a load bearing cable or the like, comprising:

first protuberance means comprising a first member applied about said cable and a first set of helically preformed elements of a predetermined internal diameter and pitch length wrapped in tightly encircling relation about said member and extending along said cable for respective predetermined distances in either direction therefrom for securing said first member to said cable so as to form a protuberance on said cable in the region of said first member;

second protuberance means comprising a second member composed of a plurality of sections applied in overlying relation of said first member and a second set of helically preformed elements of a predetermined internal diameter and pitch length wrapped in tightly encircling relation about said second member in overlying relation to said first set of helically preformed elements and extending along said cable for respective predetermined distances in either direction therefrom for securing said second member to said first set of rods so as to further enlarge said first protuberance;

and housing means for seating said enlarged protuberance with said first and second protuberance means adapted for sharing the load on said load bearing cable, said housing means having an aperture of a diameter intermediate that of said cable and said enlarged protuberance for passing said cable.

2. The termination appliance of claim 1 in which said first member is of an internal diameter for freely passing said cable and in which said second member is composed of a pair of mating sections for only partially encompassing said first protuberance so that pressure on said second member is translated to said first set of helically preformed elements.

3. The termination appliance of claim 2 in which said first set of helically preformed elements extend in opposite directions from said first member by respective distances at least equal to those of said second set of helically preformed elements.

4. The termination appliance of claim 3 in which said first and second sets of helically preformed elements are of an opposite hand of lay.

5. The termination appliance of claim 4 in which said second member extends along said cable a greater distance than said first member.

6. The termination appliance of claim 5 in which said first member includes a cylindrical aperture corresponding to the diameter of said cable and is of an ellipsoidal exterior contour and in which said second member is of a generally ellipsoidal interior contour for conforming to said protuberance and is further of an ellipsoidal outer contour.

7. The termination appliance of claim 6 in which said housing means includes an open receiving end of a diameter exceeding the maximum diameter of said enlarged protuberance, a restraining end having sidewalls for seating said protuberance and a housing passageway interconnecting said receiving and restraining ends.

8. The termination appliance of claim 7 and further including retainer means received within said housing means passage in threaded engagement with said housing and in conforming engagement with that portion of said enlarged protuberance opposite said restraining end of said housing.

9. The termination appliance of claim 8 and further including a clevis member threadably connectable to said housing means at said open receiving end.

10. The termination appliance of claim 1 in which said housing means comprises a pair of mating half-sections cooperatively defining a contoured receiving portion for conformably seating said enlarged protuberance and having an aperture for passing said cable.

11. The termination appliance of claim 1 in which said first set of helical elements is of a like hand of lay as that of said cable.

12. The termination appliance of claim 1 in which said cable and said first and second sets of helical elements are of a like hand of lay.

* * * * *